US010184040B2

(12) United States Patent
Weber et al.

(10) Patent No.: US 10,184,040 B2
(45) Date of Patent: Jan. 22, 2019

(54) POLYARYLETHERSULFONE COPOLYMERS

(71) Applicant: BASF SE, Ludwigshafen (DE)

(72) Inventors: Martin Weber, Maikammer (DE); Christian Maletzko, Altrip (DE); Thomas Weiss, Ilvesheim (DE); Joerg Erbes, Karlsruhe (DE); Bastiaan Bram Pieter Staal, Limburgerhof (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 15/660,408

(22) Filed: Jul. 26, 2017

(65) Prior Publication Data
US 2017/0321031 A1    Nov. 9, 2017

Related U.S. Application Data

(62) Division of application No. 14/888,570, filed as application No. PCT/EP2014/058887 on Apr. 30, 2014, now Pat. No. 9,758,634.

(30) Foreign Application Priority Data

May 2, 2013   (EP) .................................... 13166190

(51) Int. Cl.
C08G 73/08     (2006.01)
C08K 3/26      (2006.01)
C08G 65/26     (2006.01)
C08G 65/334    (2006.01)
C08G 65/337    (2006.01)

(52) U.S. Cl.
CPC ............ *C08K 3/26* (2013.01); *C08G 65/2612* (2013.01); *C08G 65/337* (2013.01); *C08G 65/3346* (2013.01); *C08K 2003/262* (2013.01); *C08L 2205/05* (2013.01)

(58) Field of Classification Search
CPC .................. C08G 75/23; C08G 75/20; C08G k2261/3444; C08L 81/06
USPC ................................... 528/125, 126; 568/34
See application file for complete search history.

(56) References Cited

U.S. PATENT DOCUMENTS

| | | |
|---|---|---|
| 5,700,902 A | 12/1997 | Hancock et al. |
| 5,700,903 A | 12/1997 | Hancock et al. |
| 5,798,437 A | 8/1998 | Hancock et al. |
| 5,834,583 A | 11/1998 | Hancock et al. |
| 5,861,471 A | 1/1999 | Pudleiner et al. |
| 5,911,880 A | 6/1999 | Klein et al. |
| 2009/0275725 A1 | 11/2009 | Dienes et al. |
| 2013/0035457 A1 | 2/2013 | Weber et al. |

FOREIGN PATENT DOCUMENTS

| | | |
|---|---|---|
| EP | 0 739 925 A2 | 10/1996 |
| EP | 2 554 564 A1 | 2/2013 |
| JP | 1-207320 | 8/1989 |
| JP | 2001-525856 | 12/2001 |
| JP | 2002-261436 | 9/2002 |
| JP | 2006-232974 | 9/2006 |
| JP | 2012-506474 | 3/2012 |
| WO | 97/05190 | 2/1997 |
| WO | 97/22406 A1 | 6/1997 |
| WO | WO 2006/012453 A1 | 2/2006 |
| WO | 2010/046482 | 4/2010 |
| WO | 2013/020871 A1 | 2/2013 |
| WO | 2014/139935 A1 | 9/2014 |
| WO | WO 2014/140198 A1 | 9/2014 |
| WO | 2014/170391 A1 | 10/2014 |
| WO | 2014/177638 A2 | 11/2014 |
| WO | 2014/177640 A1 | 11/2014 |
| WO | 2014/184062 A1 | 11/2014 |
| WO | 2014/195234 A1 | 12/2014 |
| WO | 2014/207106 A1 | 12/2014 |
| WO | 2015/000801 A1 | 1/2015 |
| WO | 2015/007774 A1 | 1/2015 |
| WO | 2015/007775 A1 | 1/2015 |
| WO | 2015/007776 A1 | 1/2015 |
| WO | 2015/056145 A1 | 4/2015 |
| WO | 2015/057312 A1 | 4/2015 |
| WO | 2015/078707 A1 | 6/2015 |
| WO | 2015/113850 A1 | 8/2015 |
| WO | 2015/124521 A1 | 8/2015 |
| WO | 2015/132173 A1 | 9/2015 |
| WO | 2015/140032 A1 | 9/2015 |
| WO | 2015/158557 A1 | 10/2015 |

OTHER PUBLICATIONS

U.S. Appl. No. 13/599,528, filed Mar. 7, 2013, 2013/0059933 A1, Ruckdäschel, et al.
U.S. Pat. No. 8,716,381, May 6, 2014, 2014/0017427 A1, Mettlach, et al.
U.S. Pat. No. 9,296,872, Mar. 29, 2016, 2012/0296028 A1, Weber, et al.
U.S. Pat. No. 8,952,109, Feb. 10, 2015, 2013/0035457 A1, Weber, et al.
U.S. Appl. No. 13/484,994, filed Dec. 6, 2012, 2012/0309889 A1, Weber, et al.
U.S. Pat. No. 8,889,769, Nov. 18, 2014, 2012/0329919 A1, Weber, et al.
U.S. Pat. No. 8,883,904, Nov. 11, 2014, 2013/0072606 A1, Roth, et al.
U.S. Pat. No. 8,729,164, May 20, 2014, 2013/0178565 A1, Hennenberger, et al.

(Continued)

*Primary Examiner* — Shane Fang
(74) *Attorney, Agent, or Firm* — Oblon, McClelland, Maier & Neustadt, L.L.P.

(57) ABSTRACT

The invention relates to a method for preparing polyarylethersulfone-polyalkylene oxide block copolymers (PPC) comprising the polycondensation of a reaction mixture ($R_G$) comprising the components:
(A1) at least one aromatic dihalogen compound,
(B1) at least one aromatic dihydroxyl compound,
(B2) at least one polyalkylene oxide having at least two hydroxyl groups,
(C) at least one aprotic polar solvent and
(D) at least one metal carbonate,
where the reaction mixture ($R_G$) does not comprise any substance which forms an azeotrope with water.

7 Claims, No Drawings

(56) References Cited

OTHER PUBLICATIONS

U.S. Pat. No. 9,567,463, Feb. 14, 2017, 2013/0085224 A1, Weber, et al.
U.S. Appl. No. 13/851,611, filed Oct. 3, 2013, 2013/0255785 A1, Schmid, et al.
U.S. Appl. No. 14/141,134, filed Jul. 3, 2014, 2014/0183031 A1, Sigwart, et al.
U.S. Appl. No. 14/141,115, filed Jul. 3, 2014, 2014/0187737 A1, Erbes, et al.
U.S. Appl. No. 14/140,642, filed Jul. 3, 2014, 2014/0187796 A1, Sigwart, et al.
U.S. Appl. No. 14/140,679, filed Jul. 3, 2014, 2014/0183028 A1, Sigwart, et al.
U.S. Appl. No. 14/140,908, filed Jul. 3, 2014, 2014/0183029 A1, Erbes, et al.
U.S. Appl. No. 14/140,947, filed Jul. 3, 2014, 2014/0183032 A1, Sigwart, et al.
U.S. Appl. No. 14/140,861, filed Jul. 3, 2014, 2014/0183030 A1, Sigwart, et al.
U.S. Pat. No. 9,127,160, Sep. 8, 2015, 2013/0324648 A1, Weber, et al.
U.S. Pat. No. 9,120,062, Sep. 1, 2015, 2013/0306551 A1, Weber, et al.
U.S. Pat. No. 9,199,205, Dec. 1, 2015, 2013/0277318 A1, Weber, et al.
U.S. Appl. No. 13/918,164, filed Dec. 26, 2013, 2013/0341273 A1, Weber, et al.
U.S. Appl. No. 14/209,396, filed Sep. 18, 2014, 2014/0272565 A1, Gronwald et al.
U.S. Appl. No. 14/062,130, filed Apr. 30, 2015, 2015/0113867 A1, Voelkel, et al.
U.S. Appl. No. 14/062,347, filed Apr. 30, 2015, 2015/0113859 A1, Voelkel, et al.
U.S. Appl. No. 14/888,570, filed Mar. 17, 2016, 2016/0075850 A1, Weber, et al.
International Preliminary Report on Patentability dated Nov. 5, 2015 in PCT/EP2014/058887.
R. Viswanathan, et al., "Synthesis, kinetic observations and characteristics of polyarylene ether sulphones prepared via a potassium carbonate DMAC process", Polymer, vol. 25, pp. 1827-1836, (Dec. 1984).
Yuan-Ping, et al., "Preparation of Polysulfone/Poly(ethylene oxide) Block Copolymers", Macromolecules, vol. 29, No. 23, pp. 7619-7621, (1996).
International Search Report dated Sep. 10, 2014 in PCT/EP14/058887 Filed Apr. 30, 2014.
Hyo Won Kim, et al., "Gas Diffusivity, Solubility and Permeability I Polysulfone-poly (ethylene oxide) random Copolymer Membranes", Journal of Membrane Science, vol. 372 Issue 1-2, 2011, pp. 116-124.

POLYARYLETHERSULFONE COPOLYMERS

CROSS-REFERENCE TO RELATED APPLICATIONS

This application is a Divisional of U.S. Ser. No. 14/888,570 filed Nov. 2, 2015, allowed, which is a 371 Application of PCT/EP14/058887, filed Apr. 30, 2014 and claims the benefit of European Application No. 13166190.2 filed May 2, 2013.

The present invention relates to a method for preparing polyarylethersulfone-polyalkylene oxide block copolymers and to the polyarylethersulfone-polyalkylene oxide block copolymers themselves.

Polyarylethersulfone polymers belong to the group of high-performance thermoplastics and are characterized by high heat distortion resistance, good mechanical properties and an inherent flame retardance.

The preparation of polyarylethersulfones can be carried out either by the so-called hydroxide method or by the so-called carbonate method. In the preparation of polyarylethersulfone polymers by the hydroxide method, the corresponding diphenolate dianion is prepared in a first step from the aromatic dihydroxyl compound. For this purpose, the aromatic dihydroxyl compound is deprotonated by a strong base such as sodium hydroxide. The deprotonation is carried out in an aprotic polar solvent such as dimethyl sulfoxide (DMSO). The deprotonation of the aromatic dihydroxyl compound releases water. For the hydroxide method it is necessary to remove the water formed as completely as possible from the diphenolate dianion. The anhydrous diphenolate dianion formed is subsequently reacted in a second step with the aromatic dihalogen compound. The polyarylethersulfone polymer is formed in the second step. For the deprotonation of the aromatic dihydroxyl compound in the first step for the preparation of polyarylethersulfone polymers by the hydroxide method, the stoichiometric ratios between the aromatic dihydroxyl compound and the sodium hydroxide used for the deprotonation must be maintained as exactly as possible. Even minor deviations in the stoichiometry can lead to a drastic reduction in the molecular weights of the polymers formed in the reaction.

The strong bases used in the hydroxide method can, in addition, further cleave the ether links formed in the polycondensation, which leads to a further decrease in the molecular weight of the polymers formed in the reaction. The preparation of polyarylethersulfone polymers by the hydroxide method is therefore prone to error and is very complex and expensive due to the measurement complexity for the exact maintenance of the stoichiometry and the two-stage synthesis.

For the carbonate method, the aromatic dihydroxyl compound and the aromatic dihalogen compound are reacted together in the presence of carbonates, preferably potassium carbonate. In general, N,N-dimethylacetamide or NMP is used here as solvent and toluene is added as azeotroping agent for the removal of water.

Before the actual polycondensation reaction in the carbonate method, an azeotrope of toluene and water is distilled off from the reaction mixture in order to form the diphenolate dianion from the aromatic dihydroxyl compound in the reaction mixture. The carbonate method has the advantage compared to the hydroxide method that the potassium carbonate used in excess as base can be used without decreasing the molecular weights of the polymers formed. The reaction control is thereby simplified in comparison with the hydroxide method. In the methods described in the prior art for preparing polyarylethersulfone polymers by the carbonate method, the use of an azeotroping agent, such as toluene, for removal of water is absolutely essential.

An overview of the preparation of polyarylethersulfone polymers by the hydroxide method and by the carbonate method is given, for example, in J. E. McGrath et al., POLYMER 25, 1984, pp. 1827 to 1836.

Due to the good biocompatibility of polyarylethersulfone polymers, these polymers are also used as materials for producing dialysis and filter systems. For many applications, the low hydrophilicity of the polyarylethersulfone polymers is, however, a disadvantage.

Methods are described in the literature to increase the hydrophilicity of polyarylethersulfone polymers, in which hydrophilic units, such as polyalkylene oxides, are incorporated into polyarylethersulfone polymers.

For instance, F. Hancock, Macromolecules 1996, 29, pp. 7619 to 7621 describes a method for preparing polyarylethersulfone-polyethylene oxide block copolymers. The preparation is carried out by the carbonate method. For this, monomethyl polyethylene glycol (Me-PEG), bisphenol A and 4,4'-dichlorodiphenyl sulfone are reacted in the presence of potassium carbonate and a solvent mixture of N-methylpyrrolidone and toluene. It is essential for the reaction that the water of reaction formed is removed. For this purpose, the water of reaction is removed as an azeotrope of water and toluene at temperatures in the range of 150 to 160° C., before the actual polycondensation reaction sets in at temperatures between 180 and 190° C. A polyarylethersulfone-polyethylene oxide block copolymer is obtained comprising Me-PEG units as end groups of a polyarylethersulfone block.

EP 0 739 925 also describes the preparation of polyarylethersulfone-polyalkylene oxide block copolymers. The preparation is carried out by the hydroxide method. For this purpose, bisphenol A is initially deprotonated in the presence of sodium hydroxide to produce the corresponding diphenolate dianion. The deprotonation is carried out in dimethyl sulfoxide in the presence of chlorobenzene as azeotroping agent. In order to obtain the diphenolate dianion in anhydrous form, water is removed as an azeotrope with chlorobenzene. The anhydrous diphenolate dianion of bisphenol A is then reacted with dichlorodiphenyl sulfone.

U.S. Pat. No. 5,700,902 describes a method for preparing polyarylethersulfone-polyethylene oxide block copolymers by the carbonate method. In this case, monomethyl polyethylene glycol (Me-PEG) together with bisphenol A and dichlorodiphenyl sulfone are reacted in the presence of potassium carbonate. A mixture of N-methylpyrrolidone and toluene as azeotroping agent is used as solvent. The water of reaction formed is removed as an azeotrope of toluene and water.

WO 97/22406 describes a method for preparing polyarylethersulfone-polyethylene oxide block copolymers. In this method, the polyethylene glycol used to increase the hydrophilicity is activated in a first step. For the activation, the polyethylene glycol is mesylated. For this purpose, the polyethylene glycol is deprotonated with triethylamine at low temperatures in dichloromethane and subsequently reacted with methanesulfonyl chloride. In a second step, a polyarylethersulfone polymer is prepared by condensation of bisphenol A and dichlorodiphenyl sulfone. In a third step, the polyarylethersulfone polymer prepared in the second step is reacted with the activated (mesylated) polyethylene glycol, in the course of which the water of reaction is also removed as an azeotrope of toluene and water. This polycondensation is carried out in the presence of potassium carbonate as base and in N-methylpyrrolidone and toluene as solvent. The activation of the polyethylene glycol carried out in the first step is extremely expensive and complex and is therefore unsuitable for large-scale industrial synthesis.

The methods described in the prior art for preparing polyarylethersulfone-polyalkylene oxide block polymers are complex and expensive. For the known methods which are carried out by the carbonate method, the use of an azeotroping agent such as toluene or chlorobenzene is absolutely essential in order to remove the water of reaction formed. The use of these azeotroping agents leads to separation problems with the solvent mixture used in the downstream work-up steps, to relatively large recycle streams and thus to an increase in process costs. The methods described in the prior art which follow the hydroxide method are also, as described above, complex and expensive, since the synthesis must be carried out in two stages. In addition, the stoichiometry between the aromatic dihydroxyl compound and the base used must be maintained exactly. These methods are therefore prone to error and are associated with an increased measurement complexity.

In addition, the methods which use activated polyethylene glycols are disadvantageous. This is particularly due to the complexity and expense of the upstream step of activation of the polyethylene glycol used, such that these methods cannot be carried out economically on a large scale.

Moreover, in the methods described in the prior art for preparing polyarylethersulfone-polylalkylene oxide block copolymers, unsatisfactory incorporation rates of the polyalkylene oxide used to increase the hydrophilicity are usually attained. In this context, incorporation rate is understood to mean the amount of polyalkylene oxide incorporated into the polyarylethersulfone-polyalkylene oxide block copolymer obtained, based on the amount of polyalkylene oxide originally used in the polycondensation reaction. Moreover, for the methods described in the prior art for preparing polyarylethersulfone-polyalkylene oxide block copolymers, very wide molecular weight distributions are usually obtained. A measure of the molecular weight distribution is the polydispersity (Q). The polydispersity (Q) is defined as the quotient of the weight average molecular weight ($M_W$) and the number average molecular weight ($M_n$). In the methods described in the prior art, polydispersities (Q) of significantly greater than 4 are usually obtained, for example, polydispersities (Q) in the range of 4.1 to 6.3.

The object of the present invention is therefore to provide a method for preparing polyarylethersulfone-polyalkylene oxide block copolymers (PPC), which does not have, or has only to a reduced degree, the disadvantages of the methods described in the prior art. The method should be simple to carry out, as far as possible not prone to error, and inexpensive. The method according to the invention should achieve good incorporation rates based on the polyalkylene oxide used. In addition, the method according to the invention should make available polyarylethersulfone-polyalkylene oxide block copolymers (PPC) having a narrow molecular weight distribution and therefore a low polydispersity (Q). The polyarylethersulfone-polyalkylene oxide block copolymers (PPC) should have, in addition, a high glass transition temperature and also a low fraction of impurities such as azeotroping agent.

The object is achieved according to the invention by a method for preparing polyarylethersulfone-polyalkylene oxide block copolymers (PPC) comprising the polycondensation of a reaction mixture ($R_G$) comprising the components:

(A1) at least one aromatic dihalogen compound,
(B1) at least one aromatic dihydroxyl compound,
(B2) at least one polyalkylene oxide having at least two hydroxyl groups,
(C) at least one aprotic polar solvent and
(D) at least one metal carbonate,
where the reaction mixture ($R_G$) does not comprise any substance which forms an azeotrope with water.

Reaction Mixture ($R_G$)

For the preparation of the polyarylethersulfone-polyalkylene oxide block copolymer (PPC) according to the invention, a reaction mixture ($R_G$) comprising the components (A1), (B1), (B2), (C) and (D) described above is reacted. The components (A1), (B1) and (B2) enter into a polycondensation reaction.

Component (C) acts as solvent. Component (D) acts as base to deprotonate the components (B1) and (B2) during the condensation reaction.

Reaction mixture ($R_G$) is understood to mean the mixture that is used in the method according to the invention for preparing the polyarylethersulfone-polyalkylene oxide block copolymers (PPC). In the present case, all details given with respect to the reaction mixture ($R_G$) thus relate to the mixture that is present prior to the polycondensation. The polycondensation takes place during the method according to the invention, in which the reaction mixture ($R_G$) reacts by polycondensation of components (A1), (B1) and (B2) to give the target product, the polyarylethersulfone-polyalkylene oxide block copolymer (PPC). The mixture obtained after the polycondensation, which comprises the polyarylethersulfone-polylalkylene oxide block copolymer (PPC) target product, is also referred to as product mixture ($P_G$).

The components of the reaction mixture ($R_G$) are generally reacted concurrently. The individual components may be mixed in an upstream step and subsequently be reacted. It is also possible to feed the individual components into a reactor in which these are mixed and are then reacted.

In the method according to the invention, the individual components of the reaction mixture ($R_G$) are generally reacted concurrently. The reaction is preferably conducted in one stage. This means that the deprotonation of components (B1) and (B2) and also the condensation reaction between the components (A1) and (B1) and (B2) takes place in a single reaction stage without isolation of the intermediate products, for example the deprotonated species of components (B1) or (B2).

The method according to the invention is carried out according to the so-called carbonate method. The method according to the invention is not carried out according to the so-called hydroxide method. This means that the method according to the invention is not carried out in two stages with isolation of phenolate anions. In a preferred embodiment, the reaction mixture ($R_G$) is essentially free from alkali metal hydroxides and alkaline earth metal hydroxides. The term "essentially free", in the present case, is understood to mean that the reaction mixture ($R_G$) comprises less than 100 ppm, preferably less than 50 ppm, of alkali metal hydroxides and alkaline earth metal hydroxides, based on the total weight of the reaction mixture ($R_G$). The reaction mixture ($R_G$) is essentially free from sodium hydroxide and potassium hydroxide.

Component (A1)

The reaction mixture ($R_G$) comprises at least one aromatic dihalogen compound as component (A1). The term "at least one aromatic dihalogen compound", in the present case, is understood to mean exactly one aromatic dihalogen compound and also mixtures of two or more aromatic dihalogen compounds. The reaction mixture ($R_G$) preferably comprises at least one aromatic dihalosulfone compound as component (A1). The aromatic dihalogen compounds (component (A1)) are particularly preferably dihalodiphenyl sulfones.

The present invention therefore also relates to a method in which the reaction mixture ($R_G$) comprises at least one dihalodiphenyl sulfone as component (A1).

The component (A1) is preferably used as a monomer. This means that the reaction mixture ($R_G$) comprises component (A1) as a monomer and not as a prepolymer.

The reaction mixture ($R_G$) comprises preferably at least 50% by weight of an aromatic dihalosulfone compound, preferably a dihalodiphenyl sulfone compound, as component (A1), based on the total weight of component (A1) in the reaction mixture ($R_G$).

Preferred dihalodiphenyl sulfones are the 4,4'-dihalodiphenyl sulfones. Particular preference is given to 4,4'-dichlorodiphenyl sulfone, 4,4'-difluorodiphenyl sulfone and 4,4'-dibromodiphenyl sulfone as component (A1). 4,4'-Dichlorodiphenyl sulfone and 4,4'-difluorodiphenyl sulfone are particularly preferred, while 4,4'-dichlorodiphenyl sulfone is most preferred.

The present invention therefore also relates to a method wherein component (A1) comprises at least 50% by weight of at least one aromatic dihalosulfone compound selected from the group consisting of 4,4'-dichlorodiphenyl sulfone and 4,4'-difluorodiphenyl sulfone, based on the total weight of component (A1) in the reaction mixture ($R_G$).

In a particularly preferred embodiment, component (A1) comprises at least 80% by weight, preferably at least 90% by weight, more preferably at least 98% by weight, of an aromatic dihalosulfone compound selected from the group consisting of 4,4'-dichlorodiphenyl sulfone and 4,4'-difluorodiphenyl sulfone, based on the total weight of component (A1) in the reaction mixture ($R_G$).

In a further particularly preferred embodiment, component (A1) consists essentially of at least one aromatic dihalosulfone compound selected from the group consisting of 4,4'-dichlorodiphenyl sulfone and 4,4'-difluorodiphenyl sulfone. "Consisting essentially of", in the present case, is understood to mean that component (A1) comprises more than 99% by weight, preferably more than 99.5% by weight, particularly preferably more than 99.9% by weight, of at least one aromatic dihalosulfone compound selected from the group consisting of 4,4'-dichlorodiphenyl sulfone and 4,4'-difluorodiphenyl sulfone, based in each case on the total weight of component (A1) in the reaction mixture ($R_G$). In these embodiments, 4,4'-dichlorodiphenyl sulfone is particularly preferred as component (A1).

In a further particularly preferred embodiment, component (A1) consists of 4,4'-dichlorodiphenyl sulfone.

Component (B1)

The reaction mixture ($R_G$) comprises at least one aromatic dihydroxyl compound as component (B1). The term "at least one aromatic dihydroxyl compound", in the present case, is understood to mean exactly one aromatic dihydroxyl compound and also mixtures of two or more aromatic dihydroxyl compounds. The aromatic dihydroxyl compounds used are typically compounds having two phenolic hydroxyl groups. Since the reaction mixture ($R_G$) comprises a metal carbonate, the hydroxyl groups of component (B1) in the reaction mixture may be present partially in deprotonated form. The same applies to component (B2).

Component (B1) is preferably used as a monomer. This means that the reaction mixture ($R_G$) comprises component (B1) as a monomer and not as a prepolymer.

Suitable aromatic dihydroxyl compounds (component (B1)) are, for example, selected from the group consisting of 4,4'-dihydroxybiphenyl and 4,4'-dihydroxydiphenyl sulfone.

In principle, other aromatic dihydroxyl compounds can also be used, such as bisphenol A (IUPAC name: 4,4'-(propane-2,2-diyl)diphenol)). The advantageous effects according to the invention, i.e. the low polydispersity (Q) and the high incorporation rates of polyalkylene oxide, are particularly pronounced, however, using dihydroxyl compounds (component (B1)) selected from the group consisting of 4,4'-dihydroxybiphenyl and 4,4'-dihydroxydiphenyl sulfone.

In the methods described in the prior art, exclusively polyarylethersulfone-polyalkylene oxide block copolymers (PPC) comprising bisphenol A as aromatic dihydroxyl compound and a dihalodiphenyl sulfone as aromatic dihalogen compound are prepared. The polyarylethersulfone-polyalkylene oxide block copolymers (PPC) prepared in the prior art, comprising bisphenol A as aromatic dihydroxyl compound, are also referred to as polysulfone-polyalkylene oxide block copolymers.

In one embodiment of the present invention, the reaction mixture ($R_G$) does not comprise any bisphenol A.

Component (B1) generally comprises at least 50% by weight, preferably at least 80% by weight, particularly preferably at least 90% by weight and especially at least 98% by weight of an aromatic dihydroxyl compound selected from the group consisting of 4,4'-dihydroxybiphenyl and 4,4'-dihydroxydiphenyl sulfone, based on the total weight of component (B1) in the reaction mixture ($R_G$). 4,4'-Dihydroxydiphenyl sulfone is particularly preferred as aromatic dihydroxyl compound.

The present invention therefore also relates to a method in which component (B1) comprises at least 50% by weight of an aromatic dihydroxyl compound selected from the group consisting of 4,4'-dihydroxybiphenyl and 4,4'-dihydroxydiphenyl sulfone, based on the total weight of component (B1) in the reaction mixture ($R_G$).

In a particularly preferred embodiment, component (B1) consists essentially of at least one aromatic dihydroxyl compound selected from the group consisting of 4,4'-dihydroxybiphenyl and 4,4'-dihydroxydiphenyl sulfone. "Consisting essentially of", in the present case, is understood to mean that component (B1) comprises more than 99% by weight, preferably more than 99.5% by weight, particularly preferably more than 99.9% by weight, of an aromatic dihydroxyl compound selected from the group consisting of 4,4'-dihydroxybiphenyl and 4,4'-dihydroxydiphenyl sulfone, based in each case on the total weight of component (B1) in the reaction mixture ($R_G$).

In a particularly preferred embodiment, component (B1) consists of 4,4'-dihydroxydiphenyl sulfone.

Component (B2)

The reaction mixture ($R_G$) comprises at least one polyalkylene oxide having at least two hydroxyl groups as component (B2). "At least one polyalkylene oxide" is understood to mean, according to the invention, either exactly one polyalkylene oxide or mixtures of two or more polyalkylene oxides. Suitable polyalkylene oxides according to the invention are those polyalkylene oxides which are obtainable by polymerisation of ethylene oxide, 1,2-propylene oxide, 1,2-butylene oxide, 2,3-butylene oxide, 1,2-pentene oxide, 2,3-pentene oxide or mixtures of these monomers. Particularly preferred polyalkylene oxides are those having two hydroxyl groups. Such polyalkylene oxides are also referred to as polyether diols. Suitable polyalkylene oxides generally comprise 1 to 500 alkylene oxide units. Preference is given to alkylene oxides comprising 2 to 300, particularly preferably 3 to 150, especially preferably 5 to 100 and most preferably 10 to 80 alkylene oxide units.

The polyalkylene oxides which are present in the reaction mixture ($R_G$) generally have a number average molecular weight ($M_n$) of at least 200 g/mol. Preference is given to polyalkylene oxides having a number average molecular weight ($M_n$) in the range of 200 to 50 000 g/mol, particularly preferably in the range of 400 to 40 000 g/mol and particularly preferably in the range of 600 to 20 000 g/mol.

The polyalkylene oxides are preferably polyethylene glycol, polypropylene glycol and also copolymers of polyethylene glycol and polypropylene glycol.

Particular preference is given to polyethylene glycol homopolymers having a number average molecular weight ($M_n$) in the range of 600 to 20 000 g/mol.

Since a metal carbonate is present in the reaction mixture ($R_G$) as component (D), the polyalkylene oxides in the reaction mixture ($R_G$) may be present partially in deprotonated form.

The molecular weights of the polyalkylene oxides are determined by measuring the OH number. The OH number of the polyalkylene glycols (polyalkylene oxides) used is determined by means of potentiometric titration. The OH groups are initially esterified by means of an acylation mixture of acetic anhydride and pyridine. The excess of acetic anhydride is determined by titration with 1 molar KOH. From the consumption of KOH, the amount of acetic anhydride and the initial sample weight, the OH number can then be calculated.

The polyalkylene oxides which are present in the reaction mixture ($R_G$) and have at least two hydroxyl groups are added to the reaction mixture ($R_G$) as such. This means that the polyalkylene oxides are not used in activated form. "Activated form" is understood to mean hydroxyl groups which have been converted by a chemical reaction into a leaving group, such as a mesylate group.

Component (B2) generally comprises at least 50% by weight of a polyalkylene oxide which is obtainable by polymerisation of ethylene oxide, 1,2-propylene oxide, 1,2-butylene oxide, 2,3-butylene oxide, 1,2-pentene oxide, 2,3-pentene oxide or mixtures of these monomers, based on the total weight of component (B2) in the reaction mixture ($R_G$).

The present invention therefore also relates to a method wherein component (B2) comprises at least 50% by weight of a polyalkylene oxide which is obtainable by polymerisation of ethylene oxide, 1,2-propylene oxide, 1,2-butylene oxide, 2,3-butylene oxide, 1,2-pentene oxide, 2,3-pentene oxide or mixtures of these monomers, based on the total weight of component (B2) in the reaction mixture ($R_G$).

Preferred components (B2) are polyalkylene oxides which are obtainable by polymerisation of ethylene oxide, 1,2-propylene oxide or mixtures of ethylene oxide and 1,2-propylene oxide.

In a particularly preferred embodiment of the present invention, component (B2) comprises at least 80% by weight, preferably at least 90% by weight, more preferably at least 98%, by weight of a polyalkylene oxide having at least two hydroxyl groups, and which is obtainable by polymerisation of ethylene oxide, 1,2-propylene oxide or mixtures of ethylene oxide and 1,2-propylene oxide, based in each case on the total weight of component (B2) in the reaction mixture ($R_G$).

In a further particularly preferred embodiment, component (B2) consists essentially of a polyalkylene oxide which is obtainable by polymerisation of ethylene oxide, propylene oxide or mixtures of ethylene oxide and propylene oxide.

"Consisting essentially of", in the present case, is understood to mean that component (B2) comprises more than 99% by weight, preferably more than 99.5% by weight, particularly preferably more than 99.9% by weight, of at least one polyalkylene oxide which is obtainable by polymerisation of ethylene oxide, 1,2-propylene oxide or mixtures of ethylene oxide and 1,2-propylene oxide, based in each case on the total weight of component (B2) in the reaction mixture ($R_G$).

Polyethylene glycol having a number average molecular weight ($M_n$) in the range of 600 to 20 000 g/mol is particularly preferred in this embodiment.

Component (C)

The reaction mixture ($R_G$) comprises at least one aprotic polar solvent as component (C). "At least one aprotic polar solvent", according to the invention, is understood to mean exactly one aprotic polar solvent and also mixtures of two or more aprotic polar solvents.

Suitable aprotic polar solvents are, for example, anisole, dimethylformamide, dimethyl sulfoxide, sulfolane, N-methyl-2-pyrrolidone, N-ethyl-2-pyrrolidone and also mixtures of these solvents.

Preferred aprotic polar solvents are N-methyl-2-pyrrolidone, N-ethyl-2-pyrrolidone and also mixtures of these solvents. N-Methyl-2-pyrrolidone is particularly preferred as aprotic polar solvent.

The present invention therefore also relates to a method in which the reaction mixture ($R_G$) comprises N-methyl-2-pyrrolidone as component (C).

In a preferred embodiment, component (C) comprises at least 50% by weight of at least one solvent selected from the group consisting of N-methyl-2-pyrrolidone and N-ethyl-2-pyrrolidone, based on the total weight of component (C) in the reaction mixture ($R_G$). N-Methyl-2-pyrrolidone is particularly preferred as component (C).

In a further embodiment, component (C) consists essentially of N-methyl-2-pyrrolidone. "Consisting essentially of", in the present case, is understood to mean that component (C) comprises more than 99% by weight, particularly preferably more than 99.5% by weight, particularly preferably more than 99.9% by weight, of at least one aprotic polar solvent selected from the group consisting of N-methyl-2-pyrrolidone and N-ethyl-2-pyrrolidone, with preference given to N-methyl-2-pyrrolidone.

In a preferred embodiment, component (C) consists of N-methyl-2-pyrrolidone. N-Methyl-2-pyrrolidone is also referred to as NMP or N-methylpyrrolidone.

The reaction mixture ($R_G$), according to the invention, does not comprise any substance which forms an azeotrope with water. Water of reaction is formed in the method according to the invention in the condensation reaction between the components (A1), (B1) and (B2). In the methods described in the prior art, it is necessary to add an azeotropic agent in order to remove the water of reaction formed in the condensation reaction as an azeotrope.

"Azeotrope", according to the invention, is understood to mean a mixture of water and one or more further substances which cannot be separated by distillation. "Azeotrope" is therefore understood to mean, according to the invention, a mixture of water and one or more substances which, on phase transition from liquid to gaseous, behaves as if it were a pure substance. In a preferred embodiment, the reaction mixture ($R_G$) does not comprise any toluene or chlorobenzene.

Component (D)

The reaction mixture ($R_G$) comprises at least one metal carbonate as component (D). The metal carbonate is preferably anhydrous. Preference is given to alkali metal carbonates and/or alkaline earth metal carbonates as metal carbonates. At least one metal carbonate selected from the group consisting of sodium carbonate, potassium carbonate and calcium carbonate is particularly preferred as metal carbonate. Potassium carbonate is particularly preferred.

In a preferred embodiment, component (D) consists essentially of potassium carbonate. "Consisting essentially of", in the present case, is understood to mean that the component (D) comprises more than 99% by weight, preferably more than 99.5% by weight, particularly preferably more than 99.9% by weight, of potassium carbonate, based in each case on the total weight of component (D) in the reaction mixture ($R_G$).

In a particularly preferred embodiment, component (D) consists of potassium carbonate.

Potassium carbonate having a volume weighted average particle size of less than 200 µm is particularly preferred as potassium carbonate. The volume weighted average particle size of the potassium carbonate is determined in a suspension of potassium carbonate in N-methyl-2-pyrrolidone using a particle size analyser.

In a preferred embodiment, the reaction mixture ($R_G$) does not comprise any alkali metal hydroxides or alkaline earth metal hydroxides.

Particular preference is given to a reaction mixture ($R_G$) in which component (A1) comprises at least 50% by weight, preferably at least 90% by weight, particularly preferably at least 95% by weight, of 4,4'-dichlorodiphenyl sulfone, based on the total weight of component (A1) in the reaction mixture ($R_G$), component (B1) comprises at least 50% by weight, preferably at least 90% by weight, particularly preferably at least 95% by weight, of 4,4'-dihydroxydiphenyl sulfone, based on the total weight of component (B1) in the reaction mixture ($R_G$), component (B2) comprises at least 50% by weight, preferably at least 90% by weight, particularly preferably at least 95% by weight, of polyethylene glycol, based on the total weight of component (B2) in the reaction mixture ($R_G$), component (C) consists essentially of N-methylpyrrolidone and component (D) consists essentially of potassium carbonate, where the reaction mixture ($R_G$) does not comprise any substance which forms an azeotrope with water.

The present invention therefore also relates to a method in which component (A1) is 4,4'-dichlorodiphenyl sulfone, component (B1) is 4,4'-dihydroxydiphenyl sulfone and component (B2) is a polyethylene glycol.

The ratios of components (A1), (B1) and (B2) in the reaction mixture ($R_G$) may vary within wide ranges. The reaction mixture ($R_G$) generally comprises 0.7 to 0.995 mol of component (B1) and 0.005 to 0.3 mol of component (B2) per 1 mole of component (A1).

The present invention therefore also relates to a method in which the reaction mixture ($R_G$) comprises 0.7 to 0.995 mol of component (B1) and 0.005 to 0.3 mol of component (B2) per one mole of component (A1).

Polyarylethersulfone-polyalkylene Oxide Block Copolymer (PPC)

To prepare the polyarylethersulfone-polyalkylene oxide block copolymer (PPC) according to the invention, the reaction mixture ($R_G$) is reacted under the conditions of the so-called carbonate method. The reaction (polycondensation reaction) is generally conducted at temperatures in the range of 80 to 250° C., preferably in the range of 100 to 220° C., where the upper limit of the temperature is determined by the boiling point of the solvent at standard pressure (1013.25 mbar). The reaction is generally carried out at standard pressure. The reaction is preferably carried out over a time interval of 2 to 12 hours, particularly in the range of 3 to 10 hours.

The isolation of the polyarylethersulfone-polyalkylene oxide block copolymer (PPC) obtained according to the invention may be carried out, for example, by precipitation of the polymer solution in water or mixtures of water with other solvents. The precipitated PPC can subsequently be extracted with water and then dried. In one embodiment of the invention, the precipitate can also be taken up in an acidic medium. Suitable acids are, for example, organic or inorganic acids, for example carboxylic acids such as acetic acid, propionic acid, succinic acid or citric acid, and mineral acids such as hydrochloric acid, sulfuric acid or phosphoric acid.

The method according to the invention achieves high incorporation rates of the polyalkylene oxide (component (B2)). Incorporation rates with respect to the polyalkylene oxide, in the present case, are understood to mean the amount of the polyalkylene oxide which is present in covalently bound form in the polyarylethersulfone-polyalkylene oxide block copolymer (PPC) following the polycondensation, based on the amount of the polyalkylene oxide (component (B2)) originally present in the reaction mixture ($R_G$). The method according to the invention achieves incorporation rates of ≥85%, preferably ≥90%.

The present invention therefore also relates to a method for preparing polyarylethersulfone-polyalkylene oxide block copolymers (PPC), in which at least 85% by weight, preferably at least 90% by weight, of component (B2) present in the reaction mixture ($R_G$) are incorporated into the polyarylethersulfone-polyalkylene oxide block copolymer (PPC).

Polyarylethersulfone-polyalkylene oxide block copolymers (PPC) having low polydispersities (Q) and high glass transition temperatures ($T_g$) are obtained by the method according to the invention. The polyarylethersulfone-polyalkylene oxide block copolymers, moreover, have very low amounts of impurities, for example azeotroping agents such as toluene or chlorobenzene.

The present invention therefore also provides a polyarylethersulfone-polyalkylene oxide block copolymer (PPC) which is obtainable by the method according to the invention. The polyarylethersulfone-polyalkylene oxide block copolymer (PPC) generally has a polydispersity (Q) of ≤4, preferably ≤3.5.

The polydispersity (Q) is defined as the quotient of the weight average molecular weight ($M_W$) and the number average molecular weight ($M_n$). In a preferred embodiment, the polydispersity (Q) of the polyarylethersulfone-polyalkylene oxide block copolymer (PPC) is in the range of 2.0 to ≤4, preferably in the range of 2.0 to ≤3.5.

The weight average molecular weight ($M_W$) and the number average molecular weight ($M_n$) are measured by means of gel permeation chromatography.

The polydispersity (Q) and the average molecular weights of the polyarylethersulfone-polyalkylene oxide block copolymer (PPC) were measured by means of gel permeation chromatography (GPC) in dimethylacetamide (DMAc). The mobile phase (eluent) used was DMAc comprising 0.5% by weight of lithium bromide. The concentration of the polyarylethersulfone-polyalkylene oxide block copolymers (PPC solution) was 4 mg per milliliter of solution. After filtration (pore size 0.2 μm), 100 μl of this solution were injected into the GPC system. Four different columns (heated to 80° C.) were used for separation (GRAM precolumn, GRAM 30A, GRAM 1000A, GRAM 1000A; separation material: polyester copolymers ex. PSS). The GPC system was operated at a flow rate of 1 ml per minute. A DRI-Agilent 1100 was used as the detection system. PMMA standards ex. PSS having a molecular weight $M_n$ in the range of 800 to 1 820 000 g/mol were used for the calibration.

The polyarylethersulfone-polyalkylene oxide block copolymer (PPC) obtainable by the method according to the invention generally has weight average molecular weights ($M_W$) of 10 000 to 150 000 g/mol, preferably in the range of 15 000 to 120 000 g/mol, particularly preferably in the range of 20 000 to 90 000 g/mol. The weight average molecular weights ($M_W$) are measured by means of gel permeation chromatography (GPC). The measurement is carried out as described above.

The copolymers according to the invention have a raised glass transition temperature ($T_g$). The measurement of the glass transition temperature ($T_g$) was carried out in a DSC 2000 (TA Instruments) at a heating rate of 20 K/min. For the measurement, approximately 5 mg of the substance were sealed in an aluminum crucible. In the first heating run, the samples are heated to 250° C., then rapidly cooled to −100° C. and then, in the second heating run, heated to 250° C. at 20 K/min. The respective $T_g$ value is determined from the second heating run.

In addition, the invention relates to polyarylethersulfone-polyalkylene oxide block copolymers (PPC) comprising on average 1 to 3 polyalkylene oxide blocks and 1 to 4 polyarylethersulfone blocks.

The polyarylethersulfone blocks originate from the polycondensation reaction between the components (A1) and (B1). The polyalkylene oxide blocks originate from component (B2).

The present invention is further elucidated by the following working examples without limiting it.

Components Used:
DCDPS: 4,4'-dichlorodiphenyl sulfone,
DHDPS: 4,4'-dihydroxydiphenyl sulfone,
PEG 2050: polyethylene glycol, number average molecular weight $M_n$ 2050 g/mol,
PEG 4600: polyethylene glycol, number average molecular weight $M_n$ 4600 g/mol
PEG 8000: polyethylene glycol, number average molecular weight $M_n$ 8000 g/mol,
Potassium carbonate: $K_2CO_3$, anhydrous, average particle size 32.4 μm,
NMP: N-methylpyrrolidone, anhydrous,
PPC: Polyarylethersulfone-polyethylene oxide block copolymer.

The fraction of volatile components, such as toluene, was determined by headspace gas chromatography. $T_g$, $M_n$, $M_W$ and Q were determined as described above.

The viscosity number VN was measured according to DIN ISO 1628-1 in a 1% by weight NMP solution.

The incorporation ratio (the incorporation rate) of PEG was determined by $^1$H-NMR in $CDCl_3$. In this case, the signal intensity of the aliphatic PEG units is considered in relation to the intensity of the aromatic units from the polyarylether. This gives a value for the PEG fraction in mol %, which can be converted into % by weight with the known molar weights of the corresponding structural units. The incorporation rates listed in Table 1 are then calculated as the quotient of the determined weight fraction of PEG and the theoretically calculated value.

The isolation of the polyarylethersulfone-polyalkylene oxide block copolymers (PPC) unless otherwise indicated is carried out, unless stated otherwise, by dripping an NMP solution of the polymers into demineralised water at room temperature. The drop height is 0.5 m. The throughput is about 2.5 l per hour. The beads obtained are then extracted with water (water throughput 160 l/h) at 85° C. for twenty hours. The beads are then dried at a temperature below the glass transition temperature $T_g$ to a residual moisture content of less than 0.1% by weight.

Comparative Example 1

Preparation of PPC in the Presence of Toluene as Azeotroping Agent

In a 4 liter reactor equipped with internal thermometer, gas inlet tube, reflux condenser and water separator, 574.16 g of DCDPS, 490.33 g of DHDPS, 82 g of PEG 2050 and 290.24 g of potassium carbonate were suspended in 1053 ml of NMP under a nitrogen atmosphere. 250 ml of toluene were added as azeotroping agent. The mixture was heated to 160° C. and maintained at this temperature for 1 h. During this time an azeotrope of toluene and water is distilled off (amount of toluene distilled off about 100 ml). The mixture is then heated to 175° C. and maintained at this temperature for 1 h. The temperature is then increased to 190° C. and further toluene is distilled off. The reaction period is considered to be the residence time at a temperature of 190° C. After a reaction period of 6 h, the reaction is stopped by dilution with cold NMP (1947 ml). Nitrogen is then introduced (20 l per hour) and the mixture cooled. The potassium chloride produced is filtered off.

Comparative Example 2

Preparation of PPC in the Presence of Toluene as Azeotroping Agent

In a 4 liter reactor equipped with internal thermometer, gas inlet tube, reflux condenser and water separator, 574.16 g of DCDPS, 485.33 g of DHDPS, 123 g of PEG 2050 and 290.24 g of potassium carbonate were suspended in 1053 ml of NMP under a nitrogen atmosphere. 250 ml of toluene were added as azeotroping agent. The mixture was heated to 160° C. and maintained at this temperature for 1 h. During this time an azeotrope of toluene and water is distilled off (amount of toluene distilled off about 100 ml). The mixture is then heated to 175° C. and maintained at this temperature for 1 h. The temperature is then increased to 190° C. and further toluene is distilled off. The reaction period is considered to be the residence time at a temperature of 190° C. After a reaction period of 6 h, the reaction is stopped by dilution with cold NMP (1947 ml). Nitrogen is then introduced (20 l per hour) and the mixture cooled. The potassium chloride produced is filtered off.

Example 3 (Inventive)

Preparation of PPC in the Absence of an Azeotroping Agent

In a 4 liter reactor equipped with internal thermometer, gas inlet tube and reflux condenser with water separator, 574.16 g of DCDPS, 490.33 g of DHDPS, 82 g of PEG 2050 and 290.24 g of potassium carbonate were suspended in 1053 ml of NMP under a nitrogen atmosphere. The mixture is heated to 190° C. within 1 hour. The reaction period is considered to be the residence time at 190° C. The water of reaction is distilled off and the fill level kept constant by addition of NMP during the reaction. After a reaction period of 6 h, the reaction is stopped by dilution with cold NMP (1947 ml). Nitrogen is then introduced (20 l per hour) and the mixture is cooled. The potassium chloride produced is filtered off.

Example 4 (Inventive)

Preparation of PPC in the Absence of an Azeotroping Agent

In a 4 liter reactor equipped with internal thermometer, gas inlet tube and reflux condenser with water separator, 574.16 g of DCDPS, 485.33 g of DHDPS, 123 g of PEG 2050 and 290.24 g of potassium carbonate were suspended in 1053 ml of NMP under a nitrogen atmosphere. The mixture is heated to 190° C. within 1 hour. The reaction period is considered to be the residence time at 190° C. The water of reaction is distilled off and the fill level kept constant by addition of NMP during the reaction. After a reaction period of 6 h, the reaction is stopped by dilution with cold NMP (1947 ml). Nitrogen is then introduced (20 l per hour) and the mixture cooled. The potassium chloride produced is filtered off.

Example 5 (Inventive)

Preparation of PPC in the Absence of an Azeotroping Agent

In a 4 liter reactor equipped with internal thermometer, gas inlet tube and reflux condenser with water separator, 574.16 g of DCDPS, 475.32 g of DHDPS, 205 g of PEG 2050 and 290.24 g of potassium carbonate were suspended in 1053 ml of NMP under a nitrogen atmosphere. The mixture is heated to 190° C. within 1 hour. The reaction period is considered to be the residence time at 190° C. The water of reaction is distilled off and the fill level kept constant by addition of NMP during the reaction. After a reaction period of 6 h, the reaction is stopped by dilution with cold NMP (1947 ml). Nitrogen is then introduced (20 l per hour) and the mixture cooled. The potassium chloride produced is filtered off.

Example 6 (Inventive) Preparation of PPC in the Absence of an Azeotroping Agent

In a 4 liter reactor equipped with internal thermometer, gas inlet tube and reflux condenser with water separator, 574.16 g of DCDPS, 490.33 g of DHDPS, 184 g of PEG 4600 and 290.24 g of potassium carbonate were suspended in 1053 ml of NMP under a nitrogen atmosphere. The mixture is heated to 190° C. within 1 hour. The reaction period is considered to be the residence time at 190° C. The water of reaction is distilled off and the fill level kept constant by addition of NMP during the reaction. After a reaction period of 6 h, the reaction is stopped by dilution with cold NMP (1947 ml). Nitrogen is then introduced (20 l per hour) and the mixture cooled. The potassium chloride produced is filtered off.

Example 7 (Inventive)

Preparation of PPC in the Absence of an Azeotroping Agent

In a 4 liter reactor equipped with internal thermometer, gas inlet tube and reflux condenser with water separator, 574.16 g of DCDPS, 490.33 g of DHDPS, 320 g of PEG 8000 and 290.24 g of potassium carbonate were suspended in 1053 ml of NMP under a nitrogen atmosphere. The mixture is heated to 190° C. within 1 hour. The reaction period is considered to be the residence time at 190° C. The water of reaction is distilled off and the fill level kept constant by addition of NMP during the reaction. After a reaction period of 6 h, the reaction is stopped by dilution with cold NMP (1666 ml). Nitrogen is then introduced (20 l per hour) and the mixture cooled. The potassium chloride produced is filtered off.

Comparative Example 8

Preparation of PPC in the Presence of Chlorobenzene as Azeotroping Agent

A solution of 102.5 g of PEG 2050 in 500 ml of dimethyl sulfoxide (DMSO) is prepared. To this solution are added 18.15 g of 30% sodium methoxide solution in methanol. The methanol formed is distilled off at a bottom temperature of 85° C. to give a PEG 2050-alkoxide.

In a 4 L reactor equipped with internal thermometer, gas inlet tube and reflux condenser with water separator, 216.85 g of bisphenol A, 600 g of DMSO and 725 g of chlorobenzene are combined under a nitrogen atmosphere and heated. At an internal temperature of 75° C., 179.25 g of aqueous NaOH (44.7%) are added over 10 minutes and rinsed with 50 ml of chlorobenzene. From an internal temperature of 120° C., an azeotrope of water and chlorobenzene is distilled off over one hour and the temperature increased to 140° C. The chlorobenzene is fed back into the reaction vessel. Subsequently, the chlorobenzene is distilled off until an internal temperature of 145° C. is reached.

The separately prepared solution of PEG 2050-alkoxide is then added at 100° C. Subsequently, a solution of 279.98 g of DCDPS in 600 g of dry chlorobenzene, warmed to 80° C., is added over 20 minutes, and rinsed from the water separator with 50 ml of chlorobenzene. The chlorobenzene is distilled off (amount of chlorobenzene distilled off: ca. 500 g) until an internal temperature of 155° C. is reached. The temperature is maintained for one hour, after which a solution of 2.875 g of DCDPS in 5 ml of dry chlorobenzene is added, the temperature maintained a further hour and subsequently a solution of 2.175 g of DCDPS in 5 ml of dry chlorobenzene is again added, the temperature maintained for a further hour and the latter method step repeated again. 1000 g of DMSO are then added and the chlorobenzene distilled off at an internal temperature of 165° C.

The reaction mixture is cooled to 80° C. The polyarylethersulfone-polyalkylene oxide block copolymers (PPC) are isolated by dropletization of the solution into 5 l of demineralized water, which has been admixed with 200 ml of acetic acid, at room temperature. The drop height is 0.5 m and the throughput is ca. 2.5 l per hour. The resulting beads are then extracted with water at 85° C. for 20 hours (water throughput: 160 l/h). Subsequently, the beads are dried at a temperature below the glass temperature ($T_g$) at a residual moisture of less than 0.1% by weight.

Comparative Example 9

Preparation of PPC in the Presence of Chlorobenzene as Azeotroping Agent

A solution of 160.2 g of PEG 8000 in 500 ml of DMSO is prepared. To this solution are added 7.25 g of 30% sodium methoxide solution in methanol. The methanol formed is distilled off at a bottom temperature of 85° C. to give a PEG 8000-alkoxide.

In a 4 L reactor equipped with internal thermometer, gas inlet tube and reflux condenser with water separator, 223.69 g of bisphenol A, 600 g of dimethyl sulfoxide and 725 g of chlorobenzene are combined under a nitrogen atmosphere and heated. At an internal temperature of 75° C., 179.25 g of aqueous NaOH (44.7%) are added over 10 minutes and rinsed with 50 ml of chlorobenzene. From an internal temperature of 120° C., an azeotrope of water and chlorobenzene is distilled off over one hour and the temperature increased to 140° C. The chlorobenzene is fed back into the reaction vessel. Subsequently, the chlorobenzene is distilled off until an internal temperature of 145° C. is reached.

The separately prepared solution of PEG 8000-alkoxide is then added at 100° C. Subsequently, a solution of 279.98 g of DCDPS in 600 g of dry chlorobenzene, warmed to 80° C., is added over 20 minutes, and rinsed from the water separator with 50 ml of chlorobenzene. The chlorobenzene is distilled off (amount of chlorobenzene distilled off: ca. 500 g) until an internal temperature of 155° C. is reached. This temperature is maintained for one hour, after which a solution of 2.875 g of DCDPS in 5 ml of dry chlorobenzene is added, the temperature maintained for a further hour and subsequently a solution of 2.175 g of DCDPS in 5 ml of dry chlorobenzene is again added, the temperature maintained for a further hour and the latter method step repeated again.

1000 g of DMSO are then added and the chlorobenzene distilled off at an internal temperature of 165° C.

The reaction mixture is cooled to 80° C. and the polyarylethersulfone-polyalkylene oxide block copolymers (PPC) are isolated analogously to the procedure described in comparative example 8.

Example 10 (Inventive)

Preparation of PPC in the Absence of an Azeotroping Agent

In a 4 L reactor equipped with internal thermometer, gas inlet tube and reflux condenser with water separator, 574.3 g of DCDPS, 433.70 g of bisphenol A, 205 g of PES 2050 and 297.15 g of potassium carbonate were suspended in 1053 ml of NMP under a nitrogen atmosphere. The mixture is heated to 190° C. over 1 h. The residence time at 190° C. is considered to be the reaction time. The water of reaction is distilled off and the fill level is kept constant during the reaction by addition of NMP. After a reaction time of 6 h, the reaction is quenched by dilution with cold NMP (1947 ml). Nitrogen (20 l/h) is then introduced and the mixture cooled. The potassium chloride formed is filtered off.

Example 11 (Inventive)

Preparation of PPC in the Absence of an Azeotroping Agent

In a 4 L reactor equipped with internal thermometer, gas inlet tube and reflux condenser with water separator, 574.3 g of DCDPS, 447.38 g of bisphenol A, 320 g of PEG 8000 and 297.15 g of potassium carbonate were suspended in 1053 ml of NMP under a nitrogen atmosphere. The mixture is heated to 190° C. over 1 h. The residence time at 190° C. is considered to be the reaction time. The water of reaction is distilled off and the fill level is kept constant during the reaction by addition of NMP. After a reaction time of 6 h, the reaction is quenched by dilution with cold NMP (1947 ml). Nitrogen (20 l/h) is then introduced and the mixture cooled. The potassium chloride formed is filtered off.

The properties of the polyarylethersulfone-polyethylene oxide block copolymers (PPC) obtained are given in the table below.

The properties of the polyarylethersulfone-polyethylene oxide block copolymers (PPC) obtained are given in the following table.

TABLE 1

| Example | C1 | C2 | 3 | 4 | 5 | 6 | 7 | C8 | C9 | 10 | 11 |
|---|---|---|---|---|---|---|---|---|---|---|---|
| VN [ml/g] | 64.2 | 73.4 | 63.2 | 79.5 | 75.4 | 87.5 | 74.5 | 55.7 | 61.2 | 61.0 | 84 |
| PEG fraction [wt %] | 8.1 | 11.4 | 8.2 | 11.6 | 18.2 | 16.3 | 24.7 | 16.1 | 22.4 | 18.3 | 25.3 |
| Q [$M_w/M_n$] | 4.3 | 4.5 | 3.0 | 3.5 | 2.9 | 3.4 | 3.2 | 4.2 | 4.3 | 3.3 | 3.2 |
| Incorporation rate [%] | 99 | 98 | 99 | 98 | 99 | 89 | 95 | 85.6 | 84.2 | 95 | 95 |
| $T_g$ [° C.] | 168 | 147 | 175 | 156 | 129 | 132 | n.d. | 89 | 71 | 101 | 74 |
| Toluene [ppm] | 5 | 7 | 0 | 0 | 0 | 0 | 0 | 0 | 0 | 0 | 0 |

In the method according to the invention, polyarylethersulfone-polyethylene oxide block copolymers having a low polydispersity (Q) are obtainable. In addition, the block copolymers are characterized by high glass transition temperatures ($T_g$). In the method according to the invention, moreover, good incorporation rates and good viscosity numbers (VN) are achieved.

A comparison of comparative example 1 with inventive example 3, and also of comparative example 2 with inventive example 4, shows that in the polyarylether-polyethylene oxide block copolymers (PPC) (comparative example 1 and comparative example 2) prepared by the carbonate method in the presence of an azeotroping agent, the glass transition temperatures ($T_g$) are lower than in the PPC prepared in the inventive method (example 3 and example 4).

It is known that the glass transition temperature ($T_g$) is a linear function of the length of the polyarylether blocks and increases with this. Since the glass temperature of the polyarylether-polyethylene oxide block copolymers prepared according to the invention is greater than those of the PPC of the comparative examples, this shows that the polyarylether blocks are longer than in the synthesis using azeotroping agents.

Compared to the polyarylenethersulfone-polyethylene oxide block copolymers (PPC), as are obtained according to the method described in EP 0739925 (comparative example 8 and comparative example 9), the polyarylethersulfone-polyethylene oxide block copolymers (PPC) which were prepared according to the invention (example 10 and example 11) have a lower polydispersity (Q). In addition, they are characterized by higher glass temperatures ($T_g$). Moreover, higher incorporation rates and viscosity numbers (VN) are achieved. The lower glass temperature of the polyarylethersulfone-polyethylene oxide block copolymers prepared according to EP 0739925 also has a non-uniform incorporation of the PEG segments. The polyarylenethersulfone-polyethylenoxide block copolymers prepared according to the invention therefore comprise uniform PEG segments.

The invention claimed is:

1. A polyarylethersulfone-polyalkylene oxide block copolymer comprising, in polymerized form:
   (A1) an aromatic dihalogen compound;
   (B1) an aromatic dihydroxyl compound; and
   (B2) a polyalkylene oxide comprising at least two hydroxyl groups,
   wherein the polyarylethersulfone-polyalkylene oxide block copolymer has a polydispersity, which is defined as a quotient of a weight average molecular weight $M_w$ and a number average molecular weight $M_n$, of ≤3.5.

2. The polyarylethersulfone-polyalkylene oxide block copolymer according to claim 1, having a weight average molecular weight of 10,000 to 150,000g/mol.

3. The polyarylethersulfone-polyalkylene oxide block copolymer according to claim 1, having a polydispersity of 2.0 to ≤3.5.

4. The polyarylethersulfone-polyalkylene oxide block copolymer according to claim 1, wherein the aromatic dihalogen compound (A1) comprises at least one aromatic dihalosulfone compound selected from the group consisting of 4,4'-dichlorodiphenyl sulfone and 4,4'-difluorodiphenyl sulfone.

5. The polyarylethersulfone-polyalkylene oxide block copolymer according to claim 1, wherein the aromatic dihydroxyl compound (B1) comprises at least one aromatic dihydroxyl compound selected from the group consisting of 4,4'-dihydroxybiphenyl and 4,4'-dihydroxydiphenyl sulfone.

6. The polyarylethersulfone-polyalkylene oxide block copolymer according to claim 1, wherein the polyalkylene oxide comprising at least two hydroxyl groups (B2) comprises at least one polyalkylene oxide which is obtained by polymerisation of ethylene oxide, 1,2-propylene oxide, 1,2-butylene oxide, 2,3-butylene oxide, 1,2-pentene oxide, and 2,3-pentene oxide.

7. The polyarylethersulfone-polyalkylene oxide block copolymer according to claim 1, wherein the aromatic dihalogen compound (A1) is 4,4'-dichlorodiphenyl sulfone, the aromatic dihydroxyl compound (B1) is 4,4'-dihydroxydiphenyl sulfone, and the polyalkylene oxide comprising at least two hydroxyl groups (B2) is a polyethylene glycol.

* * * * *

UNITED STATES PATENT AND TRADEMARK OFFICE
CERTIFICATE OF CORRECTION

PATENT NO. : 10,184,040 B2
APPLICATION NO. : 15/660408
DATED : January 22, 2019
INVENTOR(S) : Martin Weber et al.

Page 1 of 1

It is certified that error appears in the above-identified patent and that said Letters Patent is hereby corrected as shown below:

In the Specification

Column 1, Line 7, "allowed," should read -- now U.S. Patent No. 9,758,634, --;

Column 3, Line 29, "polylalkylene" should read -- polyalkylene --;

Column 4, Line 30, "polylalkylene" should read -- polyalkylene --;

Column 16, Line 61, "polyarylenethersulfone-polyethylene" should read
-- polyarylethersulfone-polyethylene --;

Column 17, Lines 6-7, "polyarylenethersulfone-polyethylene" should read
-- polyarylethersulfone-polyethylene --.

Signed and Sealed this
Twenty-fourth Day of December, 2019

Andrei Iancu
*Director of the United States Patent and Trademark Office*